United States Patent [19]
Boirum et al.

[11] 3,807,425
[45] Apr. 30, 1974

[54] BYPASS VALVE
[75] Inventors: Don Boirum, Glendora; Darrell D. Sisil, Pomona, both of Calif.
[73] Assignees: Don Boirum; Robert Duane Martin, both of Temple City, Calif.; part interest to each
[22] Filed: May 15, 1972
[21] Appl. No.: 253,255

[52] U.S. Cl.............. 137/110, 137/599.1, 210/130
[51] Int. Cl.......................................... F16k 11/14
[58] Field of Search........... 137/110, 599.1, 625.29; 210/74, 97, 130, 133

[56] References Cited
UNITED STATES PATENTS
3,294,105  12/1966  Schaub ............................ 137/110
2,748,800  6/1956  Allen ............................ 137/599.1 X
1,937,597  12/1933  Schmidt .......................... 137/599.1
3,217,883  11/1965  Griswold ......................... 210/130 X Primary Examiner—Robert G. Nilson
Attorney, Agent, or Firm—Christie, Parker & Hale

[57] ABSTRACT

A bypass valve for diverting the flow of a fluid to an alternate path upon actuation of a remotely located control valve. Opening of the remotely located control valve transmits a signal to the bypass valve moving a pair of ball valves between a pair of seats defining the ends of a bypass path to a pair of seats located in the normal flow path for the fluid, closing the normal path and opening the bypass path. Closing of the remotely located control valve causes the reverse action and restores the path of normal fluid flow.

12 Claims, 5 Drawing Figures

PATENTED APR 30 1974

BYPASS VALVE

DESCRIPTION OF THE PRIOR ART

This invention relates to bypass valves and in particular to a remotely controlled valve for diverting the flow of water in a domestic water system to bypass a service unit such as a water softener.

In a typical residential water supply system, a number of control valves are located in the distribution pattern, some within the interior of the dwelling and some on the exterior. In the case of exterior valves such as hose bibs from which water is obtained for the lawn, garden, etc., the water as supplied from the municipal water supply system without softening treatment or the like is sufficient.

On the contrary, particularly where the water is highly mineralized in content, it is frequently desired that the water for interior use be treated, that is, softened, so as to make it more suitable for bathing, washing clothes, cooking, etc. To this end, water softening equipment is connected into the water distribution system for the dwelling, usually at a point between the municipal water main and the beginning of the actual distribution plumbing of the residence.

Since water for external use can be left in the condition in which it is received from the municipal or district water supply, it is desired to divert it around the water softening equipment so as to not unnecessarily deplete the chemicals provided in this equipment. To accomplish this some form of control is provided on the water softening equipment.

Conventionally, a manual control valve is provided on the softening equipment which is normally operated by the occupants of the dwelling when it is desired to supply water to the exterior of the house. When the use of the water externally has ceased, the valve is restored to its normal non-diverting position and the flow is again directed through the treating equipment.

A number of problems are attendant in the use of a manual bypass valve, not the least of which is the inconvenience of being required to go to the location of the bypass valve and manually operate it each time a change from diverted to nondiverted and vice versa in the water supply is required. In addition, because of the presence of suspended matter in a municipal water supply, such as sand and rock particles which may be carried along in the water stream, together with metal particles and the other accumulations which inevitably creep into a piped-in water supply system, abrasive materials are deposited in the valve seat and on the valve stem in the course of water flow through the manual bypass valve mechanism. The deposit of such minute particles and the subsequent repeated operation of the bypass valve produces severe scoring and scarring of the valve seat and valve stem resulting in rapid deterioration of the valve and a significant amount of leakage through it.

SUMMARY OF THE PRESENT INVENTION

The present invention solves the problems inherent in a manual bypass valve by providing an automatic bypass valve apparatus which is remotely actuatable. The apparatus comprises a valve housing defining a service fluid flow path and a bypass fluid flow path and valve means located within the housing for selectively directing fluid introduced therein along the service fluid flow path and the bypass fluid flow path. Control means are associated with the valve housing in operative engagement with the valve means. Sensing means are provided which are associated with a remotely located fluid supply control valve for transmitting an actuating signal to the control means when said control valve is operated.

What is provided by the present invention is an automatically controlled bypass valve system for a fluid treatment unit such as a water softener, which is automatically actuated by the operation of certain control valves such as exterior water taps. Each of the water taps on the exterior of a dwelling, for example, are provided with a sensing unit which is wired to a solenoid on the bypass valve. When any of the external taps are opened, a signal is transmitted to the solenoid, causing a pair of ball valves to move under the control of the solenoid, closing off the fluid flow path through the service unit (softener) and causing the fluid from the water main to be diverted through the bypass fluid flow path and directly to the external tap. When the exterior tap (remotely located fluid supply control valve is closed, a signal is again transmitted to the solenoid, causing the ball valves to return to their normal positions, sealing off the bypass path and again restoring fluid flow through the service path.

The system of the present invention has the advantage that operation of the bypass feature is accomplished remotely and automatically, without the necessity of going to one specific location and physically operating a manual valve. Likewise, when the need for an untreated water supply is ended, operation of the remote control valve shutting off the supply of water thereto again transmits a signal to the bypass valve restoring the normal path. Interior water taps are not provided with sensing units, and hence the flow of water to any of these outlets moves along the normal (service) path through the bypass valve housing and is treated (softened) before being supplied to this tap.

In addition to water, the bypass valve of the present invention can be used to handle many different types of fluids, such as oil, acid, gases and the like. The basic components of the valve are a pair of ball valves mounted on pivoting arms and mating valve seats. Depending upon the fluids to be piped through the bypass valve, the material of the ball valves is made of different materials, such as rubber, neoprene, nylon, and the like. By disabling solenoids and other switches associated with the bypass valve and the remote units the valve is transformed into a manual bypass valve. A pressure equalizing outlet is provided on the bypass valve housing to prevent pressure locking. The sensing unit at the remotely located control valves includes a check valve for sensing the flow of fluid to and out of the control valve.

DESCRIPTION OF THE DRAWINGS

These and other advantages of the present invention can be better understood by reference to the drawings, wherein.

DESCRIPTION OF SPECIFIC EMBODIMENT

Figure 1:
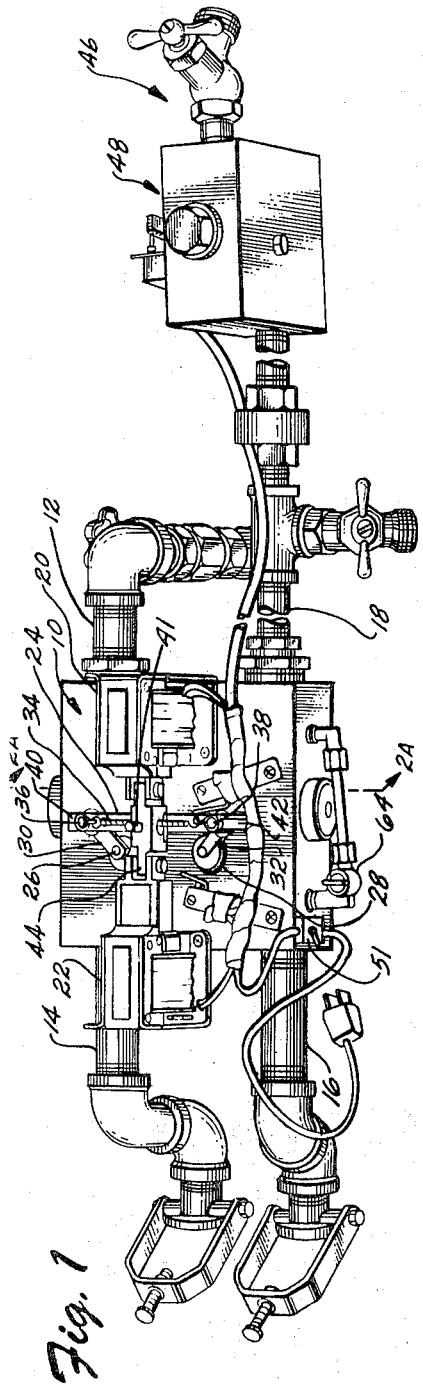
FIG. 1 is a perspective view of a bypass valve apparatus of the present invention including housing and remotely located control valve including sensing unit according to the present invention.

The bypass valve apparatus of the present invention is illustrated in the perspective view of FIG. 1 and comprises a bypass valve housing 10 to which an inlet line 12 is connected. Aligned with inlet line 12 is a service outlet line 14 which is normally in fluid communication with a service unit such as a water softener (not shown). A service inlet line 16 serves as the return line from the service unit and directs conditioned fluid back into valve housing 10. The fluid flows through the valve housing in its normal course of flow to an outlet line 18 where it communicates with the various pipes in a typical residential hot and cold water plumbing system.

A pair of solenoids 20 and 22 are mounted for reciprocal motion in the valve housing 10 and are connected in a tandem configuration to a valve actuating arm 24. As an alternative to the pair of solenoids shown in FIG. 1, a single solenoid is utilized having a "push-pull" type of action. In such a substitution this single push-pull solenoid is mechanically connected to valve actuating arm 24.

As shown in FIG. 1, arm 24 is connected to a first and second valve stem 26, 28, by means of connecting arms 30, 32 in an "over center" linkage to provide a snap action movement of the valve, assuring reliable operation. Biasing for the over center mechanism is provided by a coil spring 34 which is connected between a pair of rods 36, 38. Rods 36 and 38 are slidably retained in slots 40, 42. During actuation of the valve, rods 36 and 38 reciprocate in slots 40 and 42 and are returned to their rest position under the biasing action of coil spring 34.

A solenoid connecting arm 44 extends between solenoids 20 and 22 and engages actuating arm 24 such that when the solenoid opposite the rest position of arm 24 is actuated the bypass valve is operated, causing the fluid flow to be diverted between the service fluid flow path and the bypass fluid flow path. A third manually operable rod 41 is mounted on interconnect arm 44.

For purposes of illustration, a tap or faucet 46 is shown in FIG. 1, symbolizing a remotely located fluid supply control valve in the fluid distribution system with which the bypass valve apparatus of the invention is used. A sensing unit 48 is interposed in the line preceding valve 46 which is electrically connected to the solenoids of the bypass valve. The details of the structure of the sensing or control unit 48 will be better understood by reference to FIG. 3 and the detailed discussion below. The function of sensing unit 48 is to sense the operation of valve 46. When the valve is turned on to permit fluid to be drawn from this tap, control unit 48 reacts to the flow of fluid and transmits a signal to the bypass valve, causing it to go into the bypass condition and prevent fluid from being routed through the service unit. When the valve is turned off, the cessation of fluid flow is sensed by unit 48 and a signal again transmitted to the bypass valve, returning it to its normal condition.

Figure 2A:
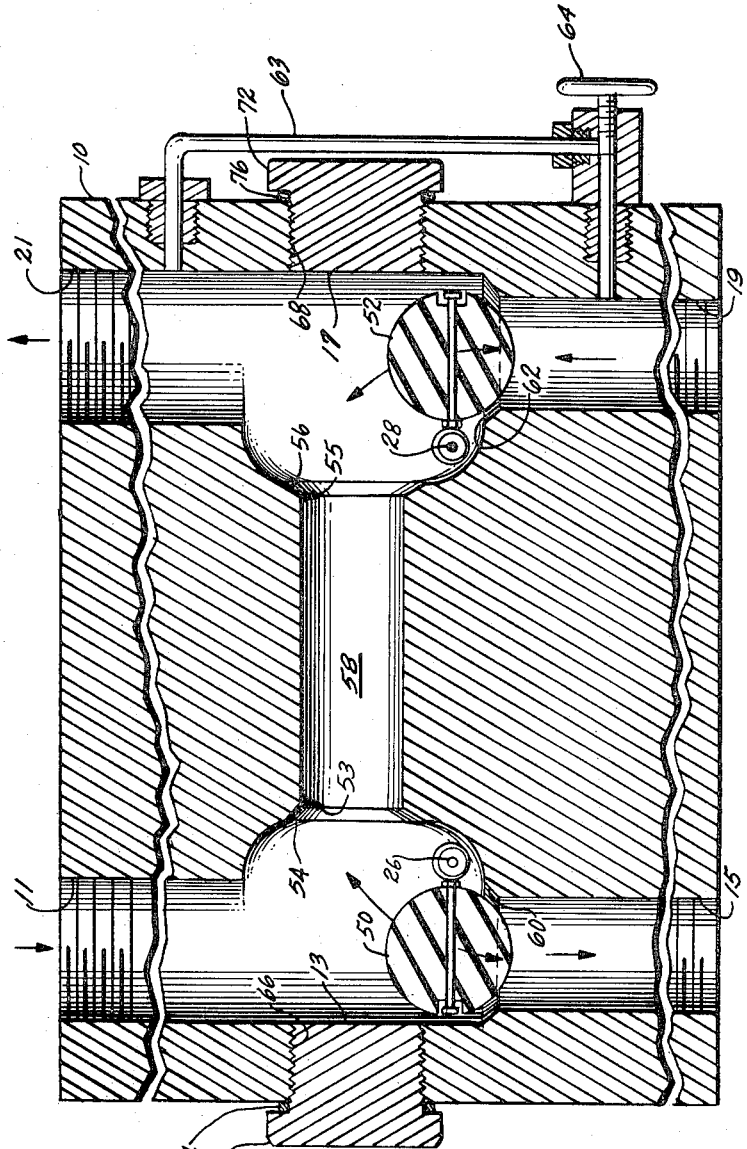
FIG. 2A is a sectional view taken along lines 2—2 of FIG. 1.
Figure 2B:
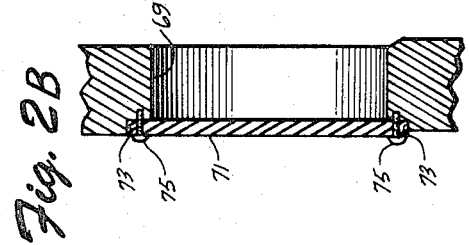
FIG. 2B is a detail view of an alternate embodiment of the access ports in FIG. 2A.

Further details of the bypass valve of the present invention are shown in FIG. 2, a sectional view through housing 10. As shown therein, inlet line 12 is connected to the housing 10 at inlet port 11 and communicates along a first conduit 13 with an outlet port 21. In this embodiment, ball valve 52 is pivoted in an approximate 90° arc between its normal and bypass positions by the operation of valve stem 28. In the normal or unactuated position, ball valves 50 and 52 are positioned against valve seats 54, 56, at an inlet port 53 and an outlet port 55, respectively, and close a fluid bypass fluid flow path or conduit 58 which extends between first conduit 13 and second conduit 17. When the bypass valve is actuated, ball valves 50 and 52 are rotated outwardly through a 90° arc and come to rest against valve seats 60 and 62 respectively, sealing off the portion of conduits 13 and 17 located on the side of bypass conduit 58 which is adjacent the water softener and opposite the inlet port 11 and outlet port 21. This actuation of the ball valves opens a fluid flow path along the bypass conduit 58 such that fluid entering the valve through line 12 exits the valve through line 18 without passing through lines 14 and 16.

Installed at one side of the valve housing 10 is a pressure equalizing tube 63 so that when the valve apparatus is in the bypass position it will not become pressure locked when the ball valves are actuated to return to their normal position when the remotely located actuating valve is again closed. A pressure relief valve 64 is located in tube 63 and is in the open position when the bypass valve apparatus is in its automatic operation phase, i.e., when operation of the valve mechanism is controlled by signals from the remotely located exterior water faucets. The pressure equalizing tube can also be incorporated into the valve housing as a permanent cast part of this structure.

Access ports 66, 68 are located at the sides of the valve housing 10 and are closed by caps 70, 72, and sealed by O-rings 74, 76. Ports 66 and 68 are provided in axial alignment with bypass conduit 58 to permit access to the valve housing for maintenance and access in case of malfunction or for the purpose of changing the ball valves 50, 52. As an alternate to threaded caps 70, 72 and threaded ports 66, 68, an access port 69 shown in FIG. 2B can be provided. In this embodiment housing 10 can be injection molded as opposed to the casting shown in FIG. 2A. Access port 69 is closed by plate 71 which is held in place in detent 73 by suitable fasteners such as screws 75. A master control switch 51 is mounted in the side of housing 10 for connecting and disconnecting a source of electrical power to the system. The source of power for the apparatus can be any one of a number of alternatives, including conventional 110 volt AC residential power or lower voltage systems such as 6, 12, or 24 volt AC power. In these latter alternatives a stepdown transformer is connected between the source of house current and the bypass valve apparatus. In addition, a battery supply can also be utilized to power the apparatus.

Figure 3:
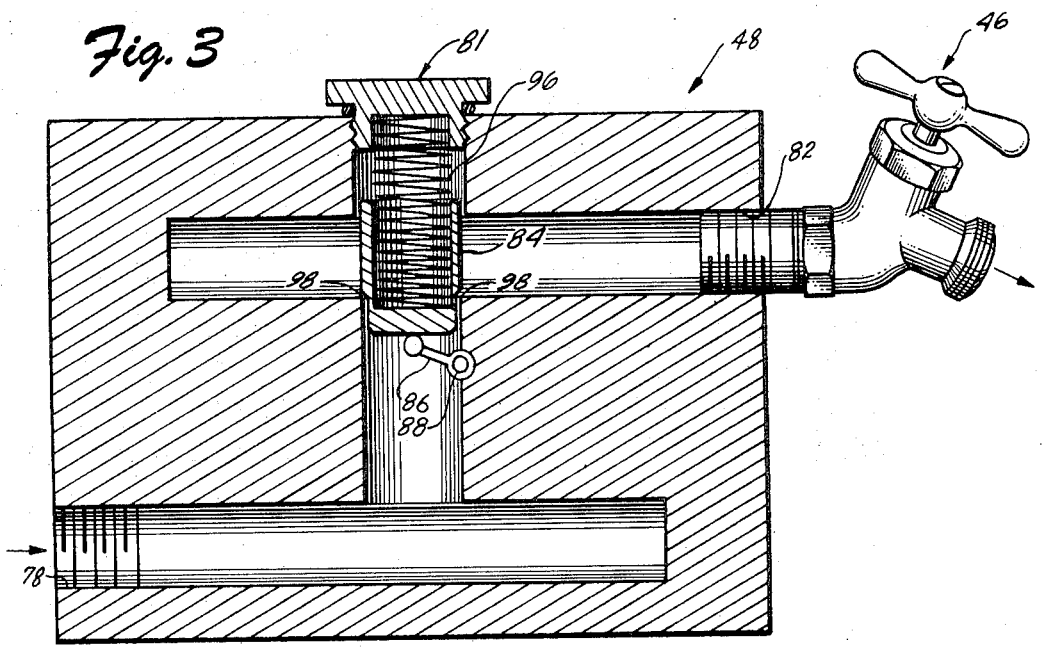
FIG. 3 is an elevational view of a sensing unit.
Figure 4:
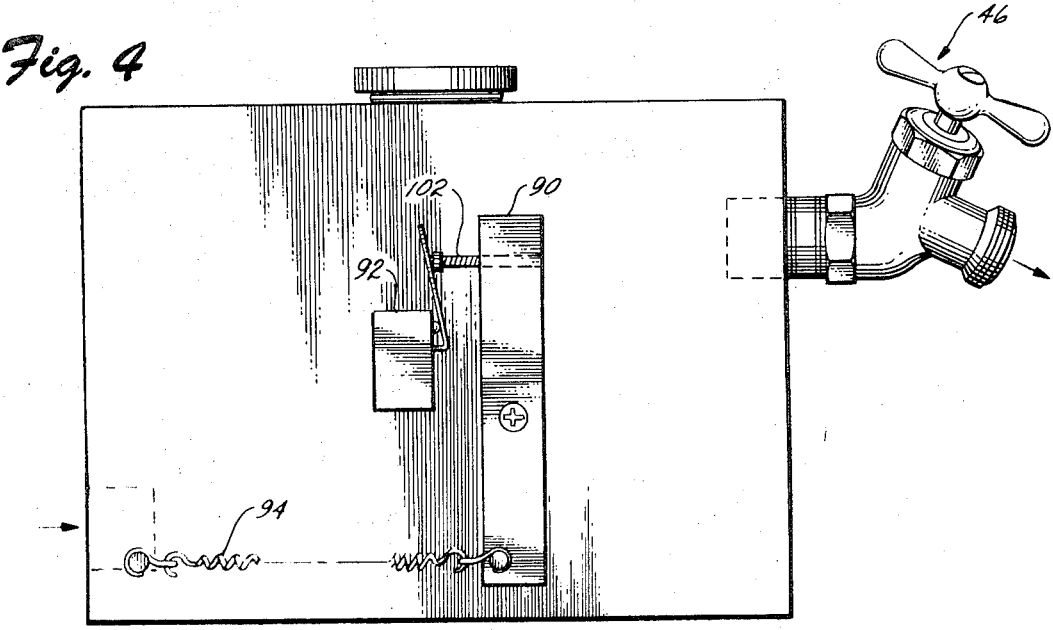
FIG. 4 is a sectional view taken along lines 4—4 of FIG. 3.

The elements of sensing unit 48 are illustrated in the sectional view of FIG. 3 and the elevational view of FIG. 4. The operation of the sensing unit will be described in conjunction with these two figures. As shown in FIG. 3, control unit 48 has fluid inlet line 78 communicating with a conventional faucet or tap 46. Tap 46 is connected to sensing unit 48 at an outlet port 82. Interposed in the path between inlet line 78 and outlet line 82 is check valve arrangement 81 which includes a spring loaded disc 84 which bears against an actuating arm 86 in its normally closed position. Arm 86 is connected by means of a pivotable connecting rod 88 to the exterior of sensing unit 48 to a rotatable arm 90 located adjacent microswitch 92.

The operation of control unit 48 is as follows: When faucet or tap 46 is opened, fluid flows through line 78, typically under a line pressure of 80 psi. The tension in biasing spring 96 is selected such that it is overcome by the pressure in line 78 when the faucet is opened, with the result that the force of the fluid pressure causes disc 84 to rise in the check valve housing. Because arm 86 is now unobstructed, arm 90 rotates under the influence of biasing spring 94. Rotation of arm 90 away from microswitch 92 causes actuation of switch 92 and transmits a signal to the solenoids on bypass valve 10, causing the valve to go into its bypass condition as long as faucet 46 is open. When the withdrawal of fluid from tap 46 is no longer needed, the faucet control handle is closed. The removal of water pressure permits biasing spring 96 to again exert a force against disc 84, moving it back to its rest position on seat 98. At the same time, downward force exerted by disc 84 causes arm 86 to rotate back to its normal position, which in turn pivots arm 90, making it return to the upright position shown in FIG. 4 against the biasing of coil spring 94. As shown in FIG. 4, actuating arm 90 is provided with a connecting rod 102. When arm 90 is returned to its directly vertical position, rod 102 has such a length as to actuate microswitch 92, again transmitting a signal to the solenoids on bypass valve 10. This causes the ball valves to return to their normal position preparatory to reception of another signal indicating water is being withdrawn from a tap which is likewise operationally interconnected with the bypass valve solenoids.

Manual control of the apparatus of the present invention is accomplished by disabling the automatic controls of the apparatus. In this mode of operation, master switch 51 is turned off and pressure equalizing valve 64 is closed. Operation of the valve between normal and bypass positions is accomplished by manual movement of rod 41 on arm 44. Automatic control is restored by reversing the foregoing steps. In one contemplated embodiment operation of a single control means such as a rod or pull ring produces disconnection of electrical power from the system by operation of the master switch and closing of the pressure equalizing tube by operation of the pressure relief valve. An electrical interlock is also optionally provided with the system to disconnect electrical power from the solenoids and microswitches after the completion of each distinct operation of the apparatus as it moves from its normal service to its bypass position and again when the system is energized to return it to its normal service position.

What is claimed is:

1. A remotely actuatable fluid bypass valve apparatus comprising
   a valve housing defining a service fluid flow path and a bypass fluid flow path, said service fluid flow path including first conduit means interconnecting a first inlet port and a first outlet port in the housing and second conduit means interconnecting a second inlet port and a second outlet port in the housing, said bypass fluid flow path including third conduit means interconnecting a third inlet port and a third outlet port in the housing, said third inlet port opening into said first conduit means intermediate the first inlet and outlet ports and said third outlet port opening into said second conduit means intermediate the second inlet and outlet ports;
   valve means located within the housing for selectively directing fluid introduced therein along the service fluid flow path and the bypass fluid flow path;
   control means associated with the valve housing operatively engaged with said valve means; and
   sensing means associated with a remotely located fluid supply control valve for transmitting an actuating signal to the control means when said control valve is operated.

2. A bypass valve apparatus according to claim 1 wherein said valve means comprises
   first ball valve means movable between valve seats located in the first and third conduit means; and
   second ball valve means movable between valve seats located in the second and third conduit means.

3. A bypass valve apparatus according to claim 2, wherein the sensing means includes check valve means located at the fluid supply control valve.

4. A bypass valve apparatus according to claim 3 wherein the sensing means includes a switch and electrical circuit means interconnecting the switch and the control means, the switch being operatively linked to the check valve means.

5. A bypass valve apparatus according to claim 4, wherein the control means comprises at least one solenoid operatively linked to the first and second ball valve means.

6. A bypass valve apparatus according to claim 5, wherein the control means comprises a first and second solenoid in tandem relation for reciprocal operation of the first and second ball valve means.

7. A bypass valve apparatus according to claim 5 including an overcenter linkage extending between the solenoid and the first and second ball valve means.

8. A bypass valve apparatus according to claim 7 including pressure equalizing means communicating between two spaced apart points in the service fluid flow path for preventing pressure locking of the valve means.

9. A bypass valve apparatus according to claim 8 including auxiliary valving means in the pressure equalizing means.

10. A bypass valve apparatus according to claim 9 including electrical circuit means for connecting the apparatus to a source of electric power.

11. A bypass valve apparatus according to claim 10 including master switch means for controlling the interconnection of the electric circuit means and the source of electric power.

12. A bypass valve apparatus according to claim 11 including manually operable means connected to the overcenter linkage for operation of the valve means.

* * * * *